(12) United States Patent
Masure et al.

(10) Patent No.: US 12,551,349 B2
(45) Date of Patent: Feb. 17, 2026

(54) IMPLANT COMPONENT

(71) Applicant: OSSTEC Limited, Baldock (GB)

(72) Inventors: Frederik Masure, Baldock (GB); Jennifer Stoddart, Baldock (GB); Hana Fox, Baldock (GB); Arron Hughes, Baldock (GB)

(73) Assignee: OSSTEC Limited, London (GB)

( * ) Notice: Subject to any disclaimer, the term of this patent is extended or adjusted under 35 U.S.C. 154(b) by 0 days.

(21) Appl. No.: 18/656,089

(22) Filed: May 6, 2024

(65) Prior Publication Data

US 2025/0099251 A1 Mar. 27, 2025

(30) Foreign Application Priority Data

Sep. 25, 2023 (GB) ...................................... 2314644

(51) Int. Cl.
*A61F 2/38* (2006.01)
*A61F 2/30* (2006.01)

(52) U.S. Cl.
CPC ... *A61F 2/3859* (2013.01); *A61F 2002/30011* (2013.01); *A61F 2002/30322* (2013.01); *A61F 2002/30784* (2013.01); *A61F 2002/30892* (2013.01); *A61F 2002/3092* (2013.01); *A61F 2002/30968* (2013.01); *A61F 2002/30985* (2013.01)

(58) Field of Classification Search
CPC ............ A61F 2/3859; A61F 2002/3092; A61F 2002/30985; A61F 2002/30784
See application file for complete search history.

(56) References Cited

U.S. PATENT DOCUMENTS

| 9,827,106 | B2 | 11/2017 | Hensley et al. |
| 11,357,635 | B2 | 6/2022 | Webb et al. |
| (Continued) | | | |

FOREIGN PATENT DOCUMENTS

| CN | 109966030 | 7/2019 |
| CN | 111345921 | 6/2020 |
| (Continued) | | |

OTHER PUBLICATIONS

Restor3d. MTP Hemiarthroplasty Implant. https://www.restor3d.com/products/mtp-hemiarthroplasty-implant. Jun. 2023 (Accessed May 5, 2024).

(Continued)

*Primary Examiner* — Javier G Blanco
(74) *Attorney, Agent, or Firm* — SNELL & WILMER L.L.P.

(57) ABSTRACT

A femoral implant component for an orthopaedic implant for knee arthroplasty, the femoral implant component includes an articulation portion including a main body having a porous structure; a solid peripheral portion comprising an articulation surface, the solid peripheral portion forming a periphery of the main body, the articulation surface being configured to articulate relative to a tibial component of the orthopaedic implant or to native anatomy, when in use; the femoral implant component including a fixing portion, the fixing portion being configured to fix the implant component to a femur of a patient; wherein the fixing portion and the articulation portion are unitary and comprise fused particles.

8 Claims, 5 Drawing Sheets

(56) References Cited

U.S. PATENT DOCUMENTS

| | | | | |
|---|---|---|---|---|
| 2007/0150067 A1* | 6/2007 | Roger | .................... | A61F 2/3859 |
| | | | | 623/20.35 |
| 2011/0313532 A1* | 12/2011 | Hunt | ........................ | A61F 2/46 |
| | | | | 623/18.11 |
| 2014/0188244 A1 | 7/2014 | Thomas et al. | | |
| 2014/0257507 A1* | 9/2014 | Wang | ...................... | A61F 2/389 |
| | | | | 623/20.34 |
| 2015/0032218 A1* | 1/2015 | Landon | ................. | A61F 2/3859 |
| | | | | 623/20.35 |
| 2015/0093283 A1 | 4/2015 | Miller et al. | | |
| 2017/0027707 A1 | 2/2017 | Cremascoli | | |
| 2018/0271666 A1 | 9/2018 | Lenz et al. | | |
| 2018/0289493 A1* | 10/2018 | Mansmann | ........... | A61F 2/3859 |
| 2021/0244545 A1 | 8/2021 | Webb et al. | | |
| 2021/0386553 A1* | 12/2021 | Catani | ................... | A61F 2/4603 |

FOREIGN PATENT DOCUMENTS

| | | | | |
|---|---|---|---|---|
| CN | 114886620 | | 8/2022 | |
| EP | 4056153 | | 9/2022 | |
| GB | 2602821 A | * | 7/2022 | ............... A61F 2/32 |

OTHER PUBLICATIONS

ISA, International Search Report and Written Opinion dated Dec. 23, 2024 in International Serial No. PCT/GB2024/052463.
UK Intellectual Property Office, Search and Examination Report dated Oct. 25, 2023 in GB Serial No. 2314644.2.

* cited by examiner

007
IMPLANT COMPONENT

CROSS-REFERENCE TO RELATED APPLICATIONS

This application claims priority to GB Patent Application No. 2314644.2, filed Sep. 23, 2023 and titled "IMPLANT COMPONENT," which is incorporated by reference herein in its entirety for all purposes.

FIELD

This invention relates generally, but not exclusively, to an implant component for an orthopaedic implant.

BACKGROUND

Components of conventional orthopaedic implants, such as components used in knee implants, are often cast as a solid, single, metal component. In these implants, the elastic modulus of the implant is significantly greater than that of the bone, which can lead to stress shielding, which may cause bone loss and implant loosening. In other words, stress installed in the bone surrounding the implant is less than that which native bone would see, which leads to suboptimal behavior of the bone.

The effects of loosening may be reduced by providing a porous coating on bone-interfacing surfaces, for example in femoral components using in knee arthroplasty. The porous coating allows bone ingrowth into the coating, thereby providing better fixation of the component into the bone. However, the porous coatings are prone to delamination of shearing off, which compromises the fixation of the implant and can cause damage to the bone.

In other orthopaedic implants, a component of the implant is additively manufactured to include a relatively large area of porous structure. The elastic modulus of the porous structure is less than a solid counterpart, and so better resembles strain in adjacent bone materials, thereby promoting bone ingrowth into the porous structure and reducing effects of stress shielding. An example of such a component is a tibial component for knee arthroplasty. However, in such components a plastic articulating joint component must be attached to the additively manufactured component. Therefore such implants are prone to failure due to the articulating joint component becoming disconnected from the additively manufactured part of the implant.

It would therefore be advantageous to address at least some of these limitations.

SUMMARY

According to an aspect of the invention there is provided a method of manufacturing an implant component for an orthopaedic implant for arthroplasty, the method comprising:
  additively manufacturing an articulation portion of the implant component, the articulation portion being configured to articulate relative to another component of the orthopaedic implant or to native anatomy; and
  additively manufacturing a fixing portion of the implant component integrally, e.g., unitarily, with the articulation portion, the fixing portion being configured to fix the implant component to a bone of a patient.

Another aspect of the invention provides a method of manufacturing an implant component, e.g., a femoral implant component, for an orthopaedic implant for arthroplasty, e.g., for knee arthroplasty, the method comprising:
  additively manufacturing an articulation portion of the implant component, additively manufacturing the articulation portion comprising:
    additively manufacturing a porous structure forming the main body of the articulation portion; and
    additively manufacturing a solid peripheral portion of the articulation portion, the solid peripheral portion comprising an articulation surface, the solid peripheral portion forming a periphery of the main body, the articulation surface being configured to articulate relative to another component, e.g., a tibial component, of the orthopaedic implant or to native anatomy, when in use; and
  additively manufacturing a fixing portion of the implant component integrally with the articulation portion, the fixing portion being configured to fix the implant component to a bone, e.g., a femur, of a patient.

It will be appreciated that, as used herein, the term 'main body' refers to the main structure of the articulation portion, and not to an auxiliary part. This is because the term 'body' is a common term in the art known to mean the main part of a structure, and this definition is further emphasized by the use of 'main' to describe the body of the articulation portion.

It will also be appreciated that 'knee arthroplasty' is either of partial or total knee arthroplasty, or hemi-arthroplasty.

The peripheral portion may otherwise be referred to as being non-porous, in that it is non-porous relative to the main body.

Advantageously, by integrally manufacturing the articulation portion and the fixing portion, the likelihood of the articulation portion becoming disconnected from the fixing portion may be greatly reduced. Further advantageously, the implant component is additively manufactured. As such, the implant component is largely produced using a single process (additive manufacture). This is in contrast to some other implant components of the prior art, which are cast and then coated with a porous coating. As such, the implant component described herein may be quicker and more cost effective to produce than such known implant components. In addition, additively manufacturing the implant component allows the internal structure of the implant component to be better controlled. For example, the internal structure of the implant component can include a porous structure allowing for more significant bone ingrowth. This is not possible with cast parts of implant components. Advantageously, there may be less material wastage by using this additive manufacturing method than when a component is produced using a subtractive manufacturing method. The additive manufacturing method may also be more efficient due to the ability to selectively heat specific, small areas of metal powder.

Additively manufacturing a porous structure forming the main body of the articulation portion may be additively manufacturing a porous structure forming an entirety of the main body of the articulation portion.

The peripheral portion may form a shell to the main body, such that the main body occupies a cavity defined by the peripheral portion.

The fixing portion and the articulation portion may be unitary and formed by 3D printing using metal powder to create the fused metal particles.

In certain embodiments, additively manufacturing the articulation portion of the implant component comprises:

additively manufacturing a lattice structure forming the main body of the articulation portion. The lattice structure may comprise a plurality of struts connected at nodes.

Advantageously, the internal structure of the main body of the implant component is porous allowing for more significant bone ingrowth. This is not possible to the same extent with cast implant components, which include only a thin porous coating which limits the amount of bone ingrowth. In addition, the porous internal structure is not subject to loosening/delamination as is the case with porous coatings used with cast implant components.

In certain embodiments, the method further comprises machining and/or polishing a surface of the peripheral portion to provide an articulation surface, the articulation surface being configured to articulate over a surface of the other component of the orthopaedic implant or to a surface of the native anatomy, when in use.

In certain embodiments, the fixing portion comprises one or more pegs.

In certain embodiments, additively manufacturing the fixing portion comprises additively manufacturing a porous structure, for example a lattice structure, the porous structure forming at least part of the one or more pegs.

Advantageously, the structure of the pegs includes a porous structure allowing for more significant bone ingrowth. This is not possible to the same extent with cast implant components, which include only a thin porous coating which limits the amount of bone ingrowth. In addition, the porous internal structure is not subject to loosening/delamination as is the case with porous coatings used with cast implant components. Bone ingrowth is particularly beneficial for the pegs, which provide the point of fixation between the bone and the implant component, so that significant bone ingrowth ensures a strong and permanent fixing between the bone and the implant component.

In certain embodiments, the porous structure forming the one or more pegs is integral with the porous structure forming the main body.

In certain embodiments, additively manufacturing the fixing portion comprises:
    additively manufacturing a porous structure, the porous structure forming at least part of the one or more pegs; and
    additively manufacturing a solid tip, or a solid peripheral rim around the porous structure at a tip, for each of the one or more pegs.

Advantageously, the solid tip, or the solid peripheral rim around the porous structure at the tip, of the pegs may help ensure the pegs can withstand any impact or loading that occurs during insertion of the pegs into corresponding peg holes in the bone.

In certain embodiments, the method further comprises applying a coating to any part of the fixing portion. The coating may be made from a different material to the fixing portion. The coating may be any of a plasma sprayed titanium surface, a plasma sprayed hydroxyapatite surface or a plasma sprayed calcium phosphate surface.

In certain embodiments, the method comprises, for a given vertical construction vector (that is for a given position in a horizontal plane):
    as a first step, additively manufacturing a support scaffold;
    as a second step, additively manufacturing the articulation portion; and
    as a third step, where required, additively manufacturing the fixing portion of the implant component extending from the articulation portion.

Advantageously, additively manufacturing the implant component in this order, ensures that it is the solid peripheral portion of the articulation portion that is deposited onto the support scaffold rather than a porous surface of the articulation portion. In this manner, the support scaffold can support the implant component during manufacture and the porous main body will not be damaged during removal of the support scaffold.

In certain embodiments, the fixing portion and the articulation portion are additively manufactured from metal, e.g., cobalt chrome.

In certain embodiments, the fixing portion and the articulation portion are additively manufactured by:
    providing metal powder; and
    selectively heating areas of the metal powder to fuse the metal powder together into a unitary metallic component.

In certain embodiments the implant component is a femoral implant component for an orthopaedic implant for knee arthroplasty, wherein the articulation portion is configured to articulate relative to a tibial component, e.g., to be in a sliding relationship with an articulating joint component attached to a tibial implant component, of the orthopaedic implant, and wherein the fixing portion is configured to fix the femoral implant component to a bone of a patient.

The main body of the articulation portion may comprise a superior surface of the articulation portion, the porous structure of the main body comprising at least part of the superior surface of the main body. The superior surface may be configured to abut resected surfaces of the femur during surgery.

A peripheral part of a superior surface of the articulation portion, which peripheral part surrounds the superior surface of the main body, may be provided by an edge of the peripheral portion.

It will be appreciated that, as used herein, 'surface' means a macro surface when referring to the porous structure. That is, the term surface is not referring to surfaces of individual cells of the porous structure but, instead, to the overall surface of the porous structure which interfaces with bone when the implant is fitted.

The femoral implant component may be for an orthopaedic implant for partial knee arthroplasty.

The femoral implant component may be for an orthopaedic implant for total knee arthroplasty.

According to another aspect of the invention there is provided computer readable instructions which, when executed by an additive manufacturing machine, are configured to implement the method according to any aspect of the invention described herein.

According to another aspect of the invention there is provided an implant component for an orthopaedic implant for arthroplasty, the implant component obtained using a method according to any aspect of the invention described herein.

According to another aspect of the invention there is provided an implant component for an orthopaedic implant for arthroplasty, the implant component comprising:
    an articulation portion being configured to articulate relative to another component of the orthopaedic implant or to native anatomy; and
    a fixing portion, the fixing portion being configured to fix the implant component to a bone of a patient;
    wherein the fixing portion and the articulation portion are unitary and comprise fused particles.

According to another aspect of the invention there is provided an implant component, e.g., a femoral implant component, for an orthopaedic implant for arthroplasty, e.g., knee arthroplasty, the implant component comprising:
  an articulation portion comprising:
    a main body having a porous structure;
    a solid peripheral portion comprising an articulation surface, the solid peripheral portion forming a periphery of the main body, the articulation surface being configured to articulate relative to another component, e.g., a tibial component, of the orthopaedic implant or to native anatomy, when in use; and
  a fixing portion, the fixing portion being configured to fix the implant component to a bone, e.g., a femur, of a patient;
  wherein the fixing portion and the articulation portion are unitary and comprise fused particles.

It will be appreciated that, as used herein, the term 'main body' refers to the main structure of the articulation portion, and not to an auxiliary part. This is because the term 'body' is a common term in the art known to mean the main part of a structure, and this definition is further emphasized by the use of 'main' to describe the body of the articulation portion.

It will also be appreciated that 'knee arthroplasty' is either of partial or total knee arthroplasty, or hemi-arthroplasty.

The peripheral portion may otherwise be referred to as being non-porous, in that it is non-porous relative to the main body.

The entirety of the main body may have a porous structure.

The peripheral portion may form a shell to the main body, such that the main body occupies a cavity defined by the peripheral portion.

In certain embodiments, the particles are fused particles from an additive manufacturing process.

The fixing portion and the articulation portion may be unitary and formed by 3D printing using metal powder to create the fused metal particles.

In certain embodiments, the articulation portion comprises:
  a main body; and
  an articulation surface which is integral with the main body, the articulation surface being configured to articulate over a surface of the other component of the orthopaedic implant or a surface of the native anatomy, when in use.

The articulation surface may be integral with the main body.

In certain embodiments, the main body of the articulation portion has a lattice structure, the lattice structure comprising a plurality of struts connected at nodes.

The fixing portion and the articulation portion may comprise, or may be formed from, the same material, i.e., they may be formed form the same metal powder.

In certain embodiments, the fixing portion comprises one or more pegs.

In certain embodiments, at least part of the one or more pegs has a porous structure.

In certain embodiments, the porous structure of the one or more pegs is integral with the porous structure of the main body.

In certain embodiments, the one or more pegs comprises a solid tip or a solid peripheral rim around the porous structure at a tip.

In certain embodiments, the implant component or an intermediate product from which the implant component derives comprises a support scaffold comprising fused particles.

In certain embodiments, the articulation portion extends from the support scaffold. In certain embodiments, the articulation portion is integral with the support scaffold. In certain embodiments, the support scaffold extends from an opposing side of the articulation portion to the fixing portion.

In certain embodiments, the fixing portion and the articulation portion comprise fused metal particles, e.g., fused cobalt chrome particles.

In certain embodiments, the implant component comprises a coating disposed on at least part of the fixing portion, the coating being of a different material to the fixing portion.

In certain embodiments, the implant component is a femoral implant component for an orthopaedic implant for knee arthroplasty, wherein the articulation portion is configured to articulate relative to a tibial component, e.g., to be in a sliding relationship with an articulating joint component attached to a tibial implant component, of the orthopaedic implant, and wherein the fixing portion is configured to fix the femoral implant component to a bone of a patient.

The main body of the articulation portion may comprise a superior surface of the articulation portion, the porous structure of the main body comprising at least part of the superior surface of the main body. The superior surface may be configured to abut resected surfaces of the femur during surgery.

A peripheral part of a superior surface of the articulation portion, which peripheral part surrounds the superior surface of the main body, may be provided by an edge of the peripheral portion.

It will be appreciated that, as used herein, 'surface' means a macro surface when referring to the porous structure. That is, the term surface is not referring to surfaces of individual cells of the porous structure but, instead, to the overall surface of the porous structure which interfaces with bone when the implant is fitted.

The femoral implant component may be for an orthopaedic implant for partial knee arthroplasty.

The femoral implant component may be for an orthopaedic implant for total knee arthroplasty.

The femoral implant component may be for an orthopaedic implant for hemi-arthroplasty.

Another aspect of the invention provides an implant component for an orthopaedic implant for arthroplasty, the implant component comprising:
  an articulation portion comprising:
  a main body having a porous structure;
  an articulation surface being configured to articulate relative to another component of the orthopaedic implant or to native anatomy, when in use; and
  a fixing portion, the fixing portion being configured to fix the implant component to a bone of a patient, the fixing portion comprising a porous structure;
  wherein the fixing portion and the articulation portion are unitary and comprise fused particles.

For the avoidance of doubt, any of the features described herein apply equally to any aspect of the invention. It will be appreciated that anatomical directions used throughout, refer to anatomical directions when the component is in-situ in the intended position and orientation in a patient. That is, posterior, anterior, superior, inferior, lateral and medial have their usual meanings, and refer to when the component is in-situ in the intended position and orientation in a patient.

Another aspect of the invention provides a computer program element comprising and/or describing and/or defining a three-dimensional design, e.g. of the component described above or an embodiment thereof. The three-dimensional design may be for use with a simulation means or an additive manufacturing means, system or device.

The computer program element may be for causing, or operable or configured to cause, an additive manufacturing means, system or device to manufacture the component described above or an embodiment thereof. The computer program element may comprise computer readable program code means for causing an additive manufacturing means, system or device to execute a procedure to manufacture the component described above or an embodiment thereof.

A further aspect of the invention provides a computer program element comprising computer readable program code means for causing a processor to execute a procedure to implement one or more steps of the aforementioned method.

A yet further aspect of the invention provides the computer program element embodied on a computer readable medium.

A yet further aspect of the invention provides a computer readable medium having a program stored thereon, where the program is arranged to make a computer execute a procedure to implement one or more steps of the aforementioned method.

A yet further aspect of the invention provides a control means or control system or controller comprising the aforementioned computer program element or computer readable medium.

For purposes of this disclosure, and notwithstanding the above, it is to be understood that any controller(s), control units and/or control modules described herein may each comprise a control unit or computational device having one or more electronic processors. The controller may comprise a single control unit or electronic controller or alternatively different functions of the control of the system or apparatus may be embodied in, or hosted in, different control units or controllers or control modules. As used herein, the terms "control unit" and "controller" will be understood to include both a single control unit or controller and a plurality of control units or controllers collectively operating to provide the required control functionality. A set of instructions could be provided which, when executed, cause said controller(s) or control unit(s) or control module(s) to implement the control techniques described herein (including the method (s) described herein). The set of instructions may be embedded in one or more electronic processors, or alternatively, may be provided as software to be executed by one or more electronic processor(s).

For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present invention is not intended to be limited to any particular arrangement. In any event, the set of instructions described herein may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. For the avoidance of doubt, the terms "may", "and/or", "e.g.", "for example" and any similar term as used herein should be interpreted as non-limiting such that any feature so-described need not be present. Indeed, any combination of optional features is expressly envisaged without departing from the scope of the invention, whether or not these are expressly claimed. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Embodiments of the invention will now be described by way of example only with reference to the accompanying drawings in which.

DETAILED DESCRIPTION

FIGS. 1 to 4 show an implant component, which in this example is a femoral implant component 100 for an orthopaedic implant for partial knee arthroplasty.

The femoral implant component 100 includes a fixing portion 102. The fixing portion 102 is configured to fix the femoral implant component 100 to a bone of a patient, in particular the femur.

Figure 1:
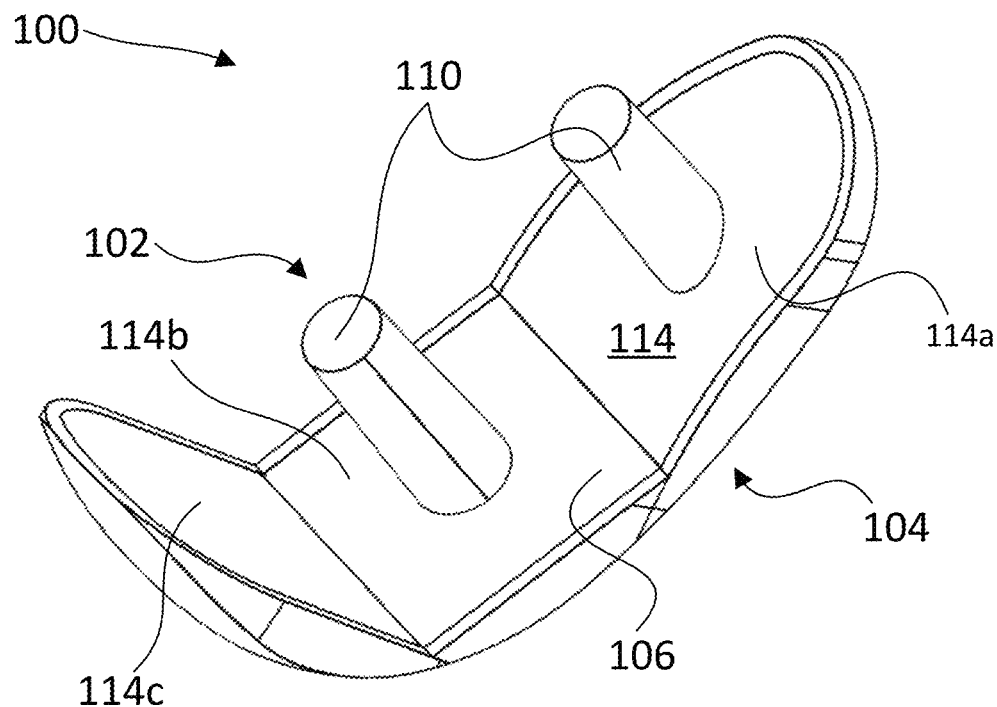
FIG. 1 is a first view of a femoral implant component.
Figure 2:
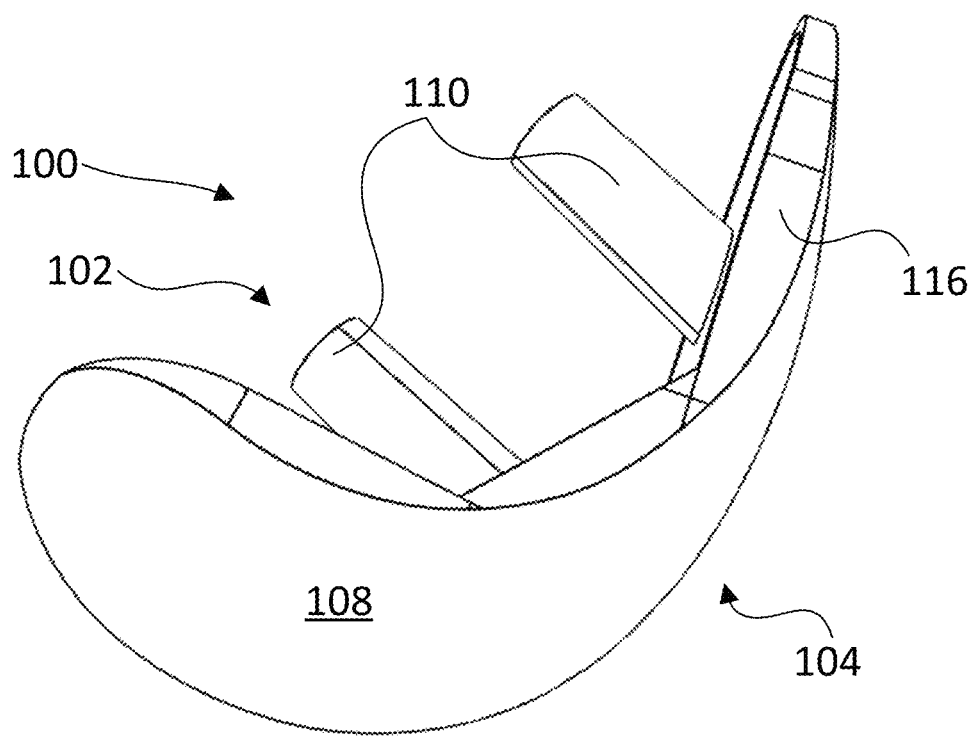
FIG. 2 is a second view of the femoral implant component of FIG. 1.
Figure 3:
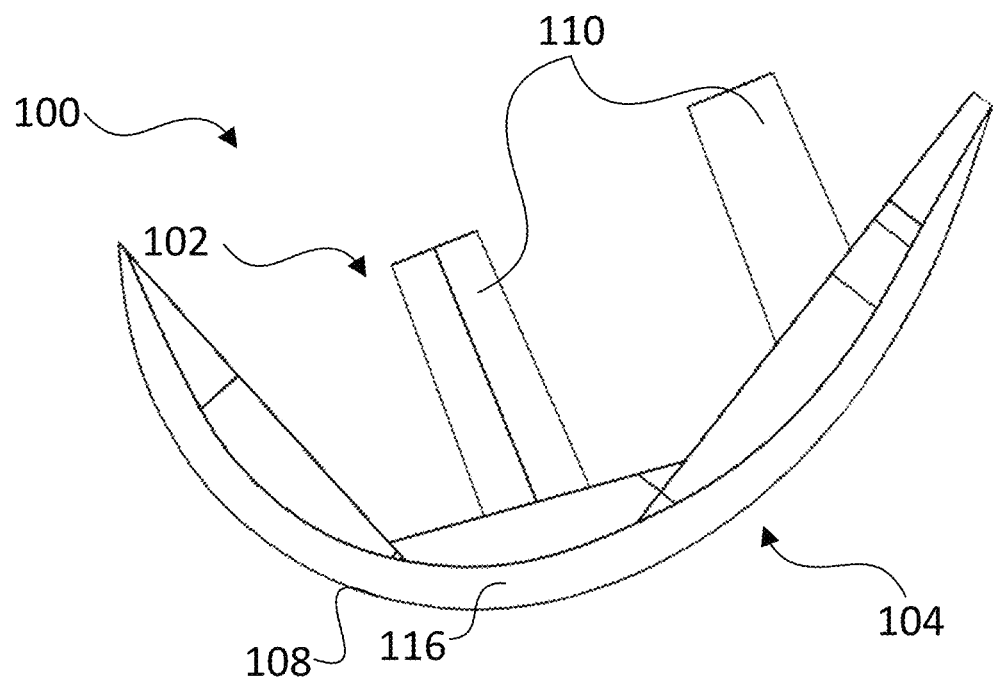
FIG. 3 is a third view of the femoral implant component of FIG. 1.
Figure 4:
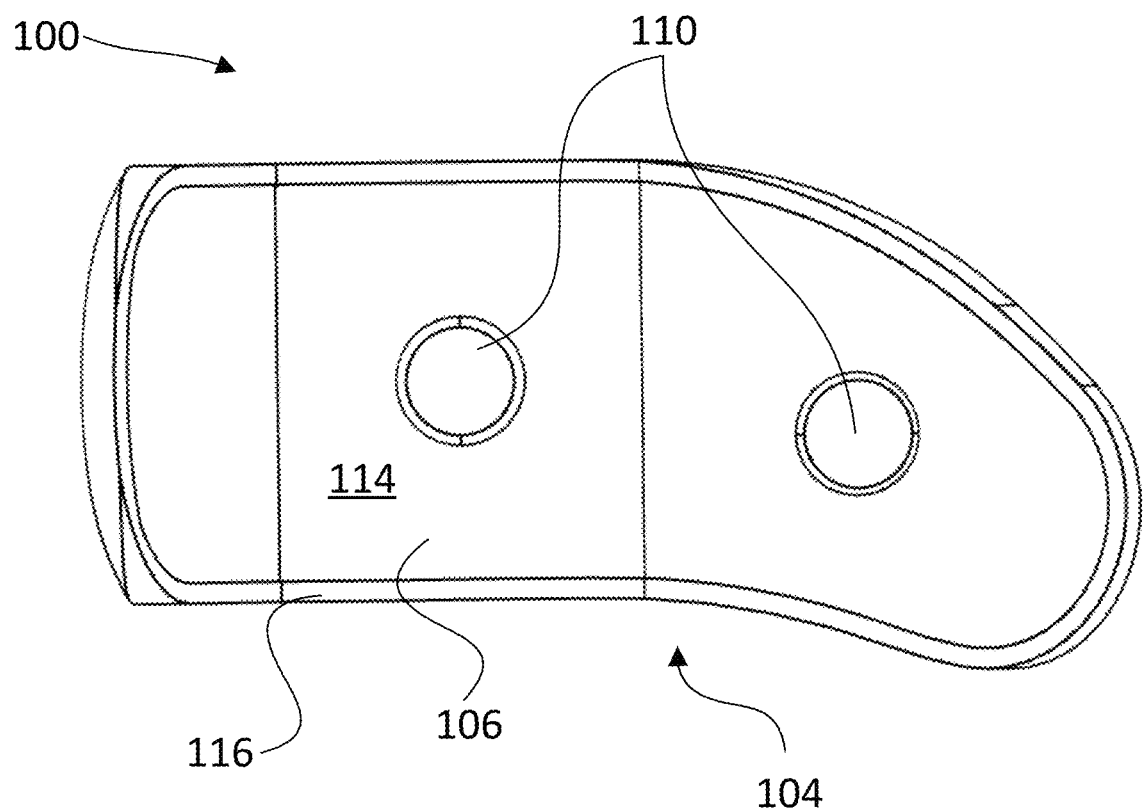
FIG. 4 is a fourth view of the femoral implant component of FIG. 1.
Figure 5:
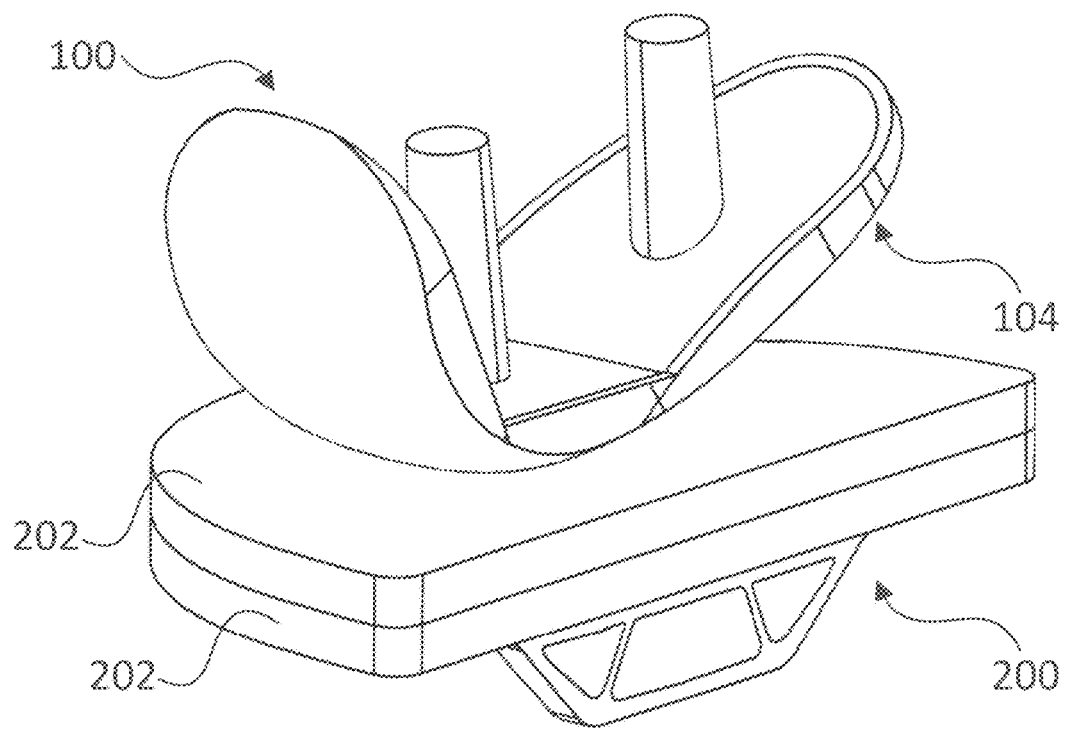
FIG. 5 is a view of an orthopaedic implant including the femoral implant component of FIG. 1.

The femoral implant component 100 includes an articulation portion 104. In use, the articulation portion 104 is configured to articulate relative to a tibial component 200 of the orthopaedic implant as shown in FIG. 5. More specifically, the articulation portion 104 is configured to be in sliding relationship with an articulating joint component 201 of the tibial component 200, which is attached to a tibial implant component 202 of the tibial component 200.

The fixing portion 102 and the articulation portion 104 comprise fused particles. In particular, the fixing portion 102 and the articulation portion 104 comprise particles that are fused together as part of an additive manufacturing process. For example the additive manufacturing process may include providing a powder and then selectively heating areas of the powder to fuse particles of the powder together into a unitary component. In this example, the additive manufacturing process uses metal powder such that the fixing portion 102 and the articulation portion 104 are formed of fused metal particles. The metal powder may, for example, include a cobalt chrome alloy. Any suitable method of additive manufacture may be used, for example a technique referred to as laser sintering.

By additively manufacturing the femoral implant component 100, the femoral implant component 100 is largely produced using a single process. This is in contrast to femoral implant components of the prior art, which are typically cast and then coated with a porous coating. As such, the femoral implant component 100 described herein is quicker and more cost effective to produce than known femoral implant components. In addition, additively manufacturing the femoral implant component 100 allows the internal structure of the femoral implant component 100 to be better controlled. For example, the internal structure of the femoral implant component 100 can include a porous structure allowing for more significant bone ingrowth. This is not possible with cast femoral implant components.

In this example, the articulation portion 104 includes a main body 106. In this example, the main body 106 of the articulation portion 104 includes an internal volume of the articulation portion 104 and includes a superior surface 114 of the articulation portion 104. That is, the articulation portion 104 has an internal volume which is at least partially provided by the main body 106. In this example the superior surface is formed of three planar subsurfaces at angles to one another: an anterior subsurface 114a; a central subsurface 114b; and a posterior subsurface 114c.

In this example, the main body 106 has a porous structure. In this example, the entirety of the main body 106 has a porous structure. That is, the main body 106 includes a structure including a plurality of pores. In this example, the porous structure of the main body 106 includes, or provides, at least part of the internal volume and at least part of the superior surface 114 of the main body 106.

The porous structure of the main body 106 is formed during the additive manufacturing process. The porous structure may be a lattice structure including a plurality of struts S connected at nodes N, the struts and nodes being formed during the additive manufacturing process.

The porous structure of the main body 106 allows or promotes bone ingrowth into the main body 106. This is not possible to the same extent with cast femoral implant components, which include only a thin porous coating which limits the amount of bone ingrowth. In addition, the porous internal structure is not subject to loosening/delamination as is the case with porous coatings used with cast femoral implant components.

Figure 6:
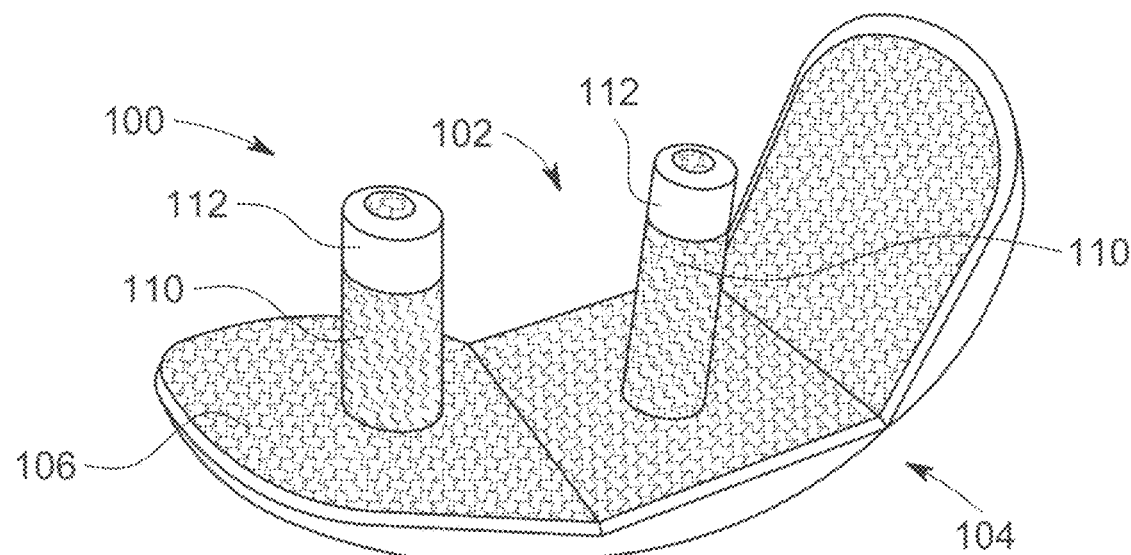
FIG. 6 shows an additively manufactured femoral component
Figure 7:
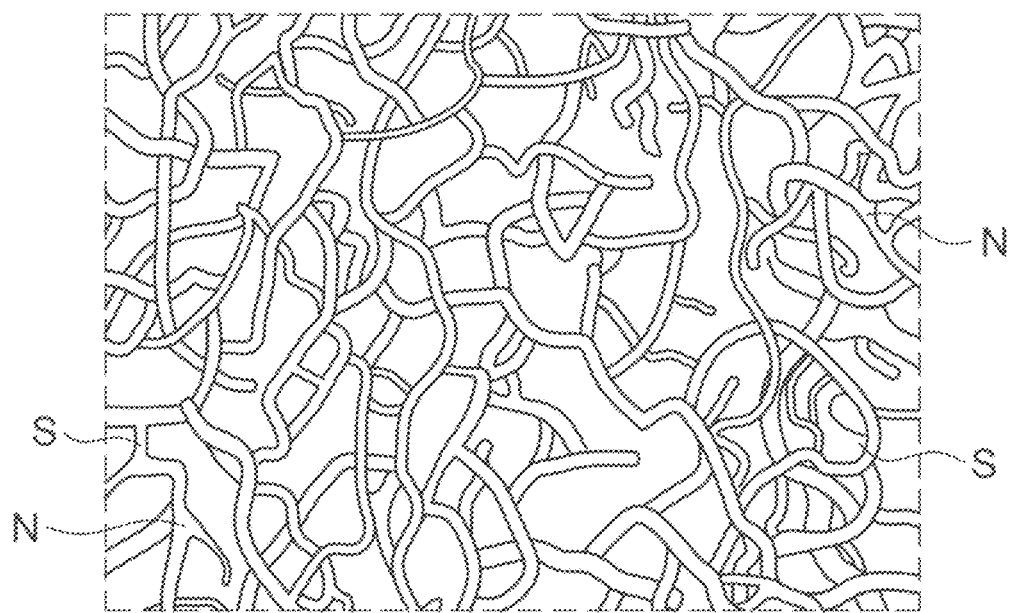
FIG. 7 shows an image of a lattice structure in a femoral implant component.

Referring now to FIG. 7 there is shown an illustration of an example lattice structure that may form the porous structure of the main body 106. The lattice structure is formed of a plurality of struts S connected together at nodes N. Most or each strut has direction components in all three Cartesian coordinates. In other words, most of the struts S do not extend within just one plane. The lattice structure has an elastic modulus of between 0.1 and 5 GPa. It will be appreciated that the elastic modulus refers to the bulk elastic modulus of the lattice structure, and not the elastic modulus of just each strut S. The lattice structure has a porosity of between 5 and 30%. The lattice structure has a strut density of between 2 and 7 struts per mm3. Each strut has a thickness, or diameter, of between 100 and 400 microns. The lattice structure is visible in the image of the femoral implant component of FIG. 6.

The fixing portion 102 includes one or more pegs 110. In this example the fixing portion 102 includes two pegs 110 but any suitable number of pegs may be used. The pegs 110 are configured so as to be received into corresponding peg holes in the femur thereby fixing the femoral implant component 100 to the femur. The pegs 110 extend in a superior direction from the superior surface 114 of the main body 106. In this example, one peg 110 extends from the central subsurface 114b and one peg extends from the anterior subsurface 114a.

In this example, at least part of each peg 110 has a porous structure. That is, the at least part of each peg 110 includes a structure comprising a plurality of pores. In this example, the porous structure of each peg 110 includes at least part of the internal volume of the peg 110 and at least part of the external surface of the peg 110.

The porous structure of the pegs 110 is formed during the additive manufacturing process. The porous structure may be structurally the same as, or similar to, the porous structure of the main body 106 described above. The lattice structure of the pegs 110 is visible in the image of the femoral implant component 100 of FIG. 6.

The porous structure of the pegs 110 allows for more significant bone ingrowth. This is not possible to the same extent with cast femoral implant components, which include only a thin porous coating. In addition, the porous internal structure is not subject to loosening/delamination as is the case with porous coatings used with cast femoral implant components. Bone ingrowth is particularly beneficial for the pegs 110, which provide the point of fixation between the femur and the femoral implant component 100, so that significant bone ingrowth ensures a strong and permanent fixing between the femur and the femoral implant component 100.

In this example, the porous structure of the pegs 110 is integral with the porous structure of the main body 106. That is, the porous structure of the pegs 110 is continuous with the porous structure of the main body 106, the continuous porous structure being formed during the additive manufacturing process.

In some examples the entirety of the pegs 110 may have a porous structure. However, in this example, each peg 110 includes a tip 112 that has a solid or non-porous rim extending around a periphery of the porous structure, as best shown in FIG. 5. In this example the solid tip 112 is still formed as part of the additive manufacturing process so as to be integral with the porous section of the peg 110. The solid tip 112 of each peg 110 helps ensure the pegs 110 can withstand any impact or loading that may occur during insertion of the pegs 110 into corresponding peg holes in the femur.

In this example, the articulation portion 104 includes an articulation surface 108. The articulation surface 108 is configured to articulate over a surface of the tibial component 200 of the orthopaedic implant when in use, as shown in FIG. 5. More specifically, the articulation surface 108 is configured to be in sliding relationship with the articulating joint component 201 of the tibial component 200, which is attached to the tibial implant component 202 of the tibial component 200. It will be appreciated that the articulation surface 104 may instead be configured to articulate over a surface of native tibial bone, in hemi-arthroplasty.

The articulation portion 104 has a peripheral portion 116 which comprises the articulation surface 108. In this example the peripheral portion 116 is solid and forms a periphery of the main body, as described in more detail subsequently. As also described in more detail subsequently, the peripheral portion 116 of this example is solid. That is, the peripheral portion 116 is substantially non-porous relative to the porous main body. As is visible in the Figures, especially in FIG. 6, the peripheral portion 116 of this example forms, or provides, a shell or covering, to the porous main body. In this way, the peripheral portion 116 defines a cavity which is occupied by the main body, for example which is occupied or filled with the porous or lattice structure.

In this example, as can be seen in the Figures, a peripheral part of a superior surface of the articulation portion 104, which peripheral part surrounds the superior surface 114 of the main body 106, is provided by an edge of the peripheral portion 116.

In this example, the articulation surface 108 and the peripheral portion 116 is integral with the main body 106. That is, the articulation surface 108 and peripheral portion 116 is unitary with the main body 106, the peripheral portion 116 forming a periphery of the main body 106. The articulation surface 108 forms an inferior surface of the articulation portion 104.

During manufacture, the articulation surface 108 is formed from the peripheral portion 116 of the articulation portion 104, the peripheral portion 116 being formed on the periphery of the main body 106—in particular on the inferior surface of the main body 106. The peripheral portion 116 is additively manufactured so as to be integral with the main body 106. In this example the peripheral portion 116 is solid or non-porous.

To form the articulation surface 108 from the peripheral portion 116, the external surface of the peripheral portion 116 (that is, the surface of the peripheral portion 116 facing away from the main body 106) is machined and/or polished to provide a solid, non-porous articulation surface 108 that has surface properties, for example sizes of carbides, protrusions and pits, which are suitable for articulation over a tibial component. It will be appreciated that the surface properties have ranges of acceptable values which differ depending upon factors such as the size of the femoral implant component and characteristics of the patient. The ranges of acceptable values may also be determined in dependence on predicted performance of other areas of the component. For example, greater ranges of acceptable values may be used if the reduction in a probability of failure of other parts of the implant outweighs any disadvantages associated with a poorer quality of the articulation surface 108. It will also be appreciated that the surface properties may differ for different, non-femoral implants, as in the examples provided subsequently.

Figure 8:
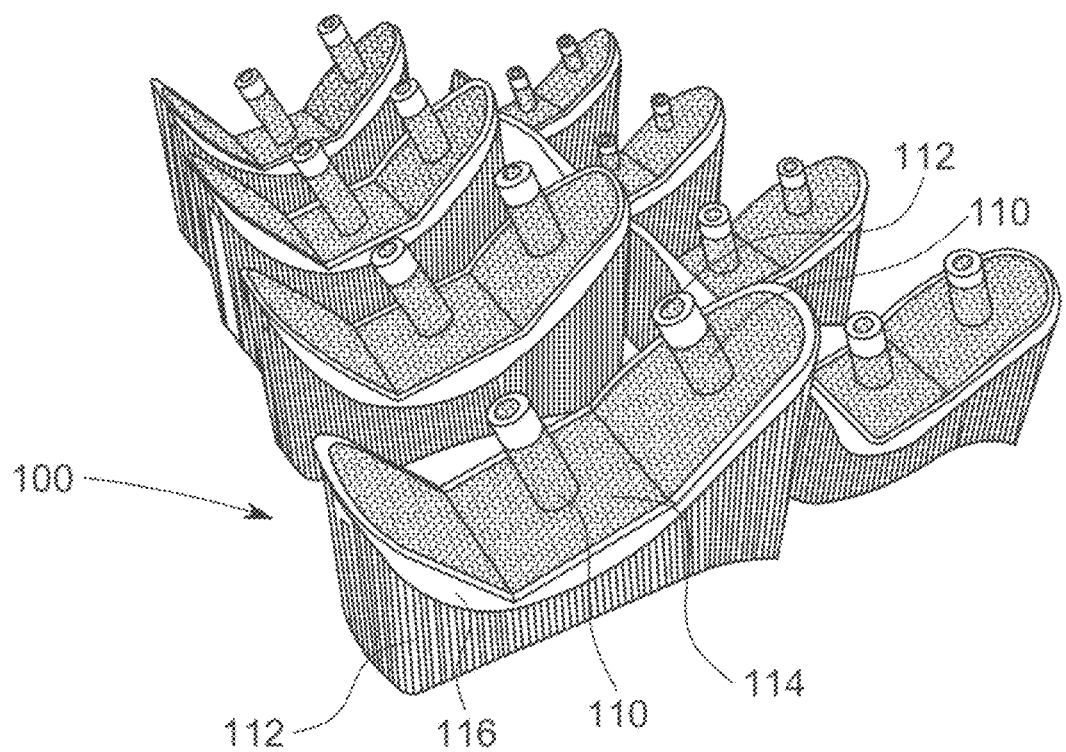
FIG. 8 shows a plurality of femoral implant components including support scaffolds.

FIG. 8 shows the femoral implant component 100 following additive manufacture thereof.

The femoral implant component 100 shown in FIG. 8 includes a support scaffold or support structure 112. In this example, the support scaffold 112 is formed during the additive manufacturing process so as to support features of the femoral implant component 100, as described below. In this example the support scaffold 112 comprises a plurality of columns extending substantially vertically. The plurality of columns are closely packed so as to provide a continuous, or relatively continuous, surface onto which other features of the femoral implant component 100 can be deposited during the additive manufacturing process. It would be understood that a support scaffold 112 of a different structure may also be used. In this example the support scaffold 112 supports the articulation portion 104, which extends in the superior direction from the support scaffold 112. More specifically, the support scaffold 112 supports the peripheral portion 116 of the articulation portion.

The femoral implant component 100 may be additively manufactured from the inferior side to the superior side—for example in line with the orientation shown in FIG. 8. That is, for a given vertical construction vector:

firstly, the support scaffold 112 is additively manufactured;

then the articulation portion 104 is deposited onto the support scaffold 112; and finally, where required, the pegs 110 are deposited onto the superior surface 114 of the articulation portion 104.

The support scaffold 112 may be additively manufactured onto a horizontal platen.

Additively manufacturing the femoral implant component 100 in this order, ensures that it is the solid peripheral portion 116 of the articulation portion that is deposited onto the support scaffold 112 rather than the porous superior surface 114 of the articulation portion 104. In this manner, the support scaffold 112 can support the femoral implant component 100 during manufacture and the porous main body 106 will not be damaged during removal of the support scaffold 112.

Following completion of the additive manufacturing process the support scaffold 112 is removed, for example by machining. This may be done as part of the formation of the articulation surface 108.

The additive manufacturing process described above is controlled by computer readable instructions which, when executed by an additive manufacturing machine, are configured to implement the manufacturing method to produce the femoral implant component 100.

An optional further step is to apply a coating to any part of the fixing portion. The coating may be made from a different material to the fixing portion. The coating may be, for example, any of a plasma sprayed titanium surface, a plasma sprayed hydroxyapatite surface or a plasma sprayed calcium phosphate surface.

It will be appreciated that anatomical directions used to describe the femoral implant component 100, and used to describe subsequent embodiments of the invention, relate to anatomical directions when the component is correctly installed in a patient. More specifically, lateral, medial, posterior, anterior, superior and inferior all have their usual anatomical meanings, and relate to the respective direction when the component is located in the patient.

Whilst the implant component described above is a femoral implant component for partial knee arthroplasty, it will be appreciated that the concept applied to producing femoral components for total knee arthroplasty, as is described with reference to FIGS. 9 and 10.

Figure 9:
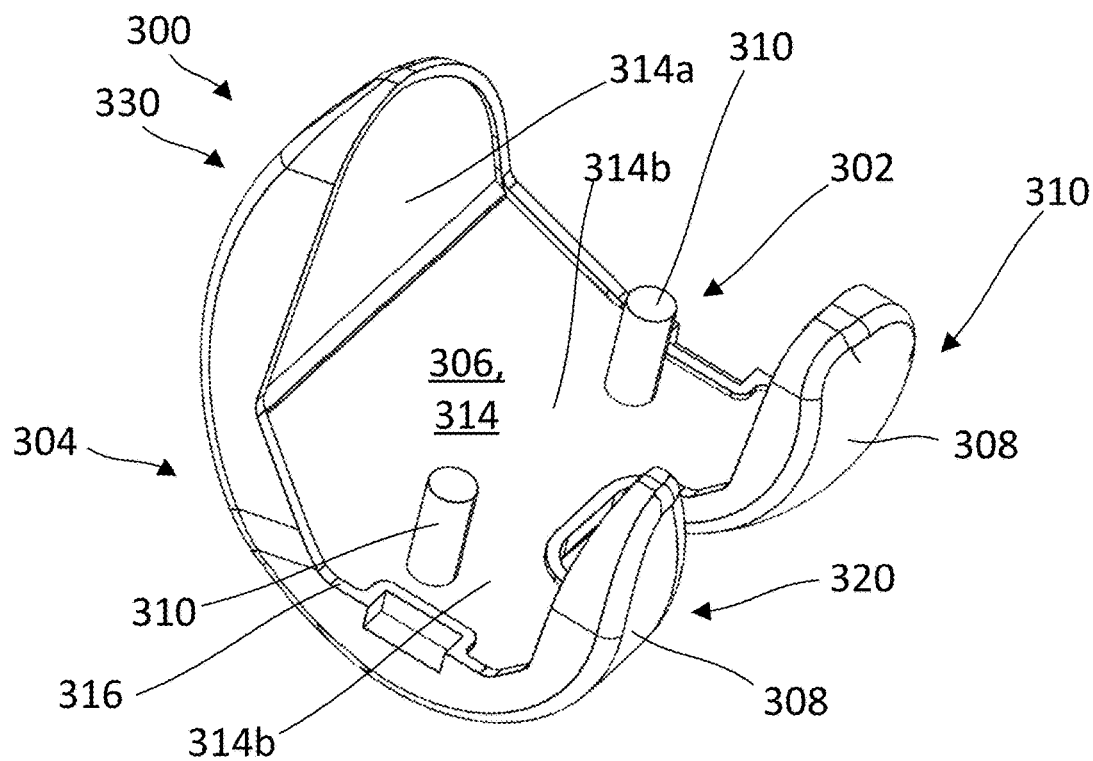
FIG. 9 shows a femoral implant according to another example.
Figure 10:
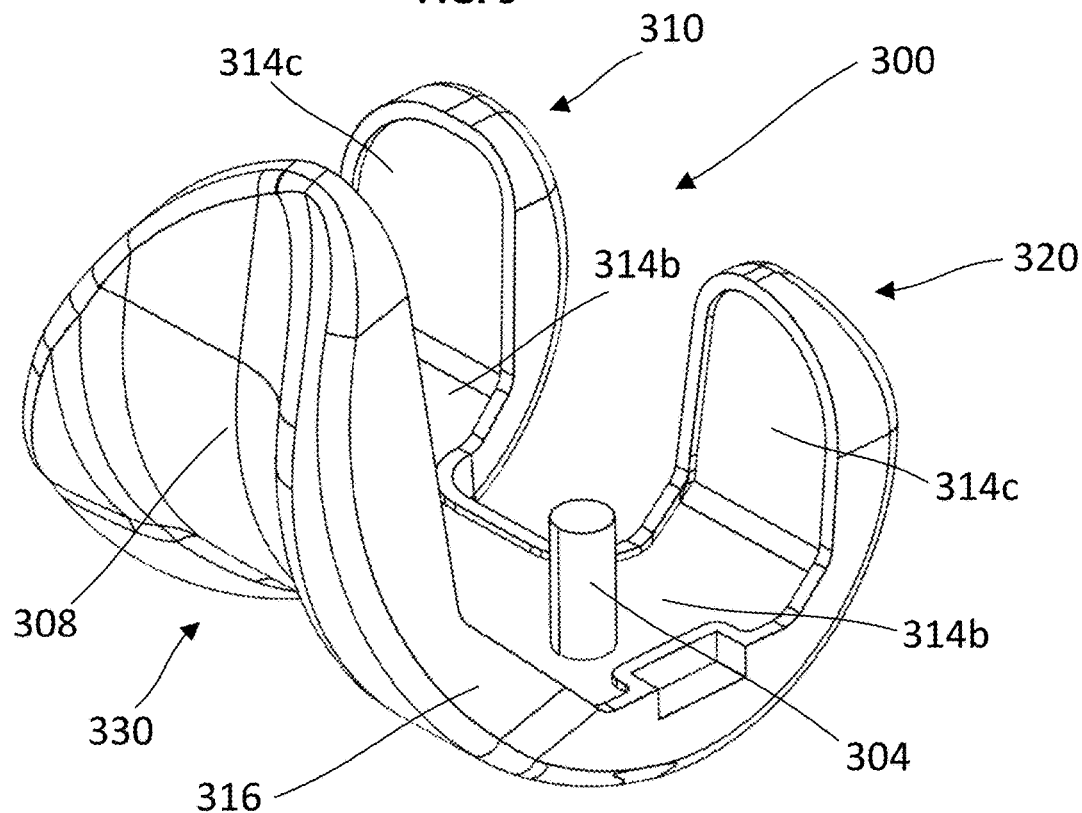
FIG. 10 shows a second view of the femoral implant of FIG. 9.

Referring to FIGS. 9 and 10, there is shown a femoral implant component 300 for total knee arthroplasty, the entirety of which is manufactured using additive manufacturing and so comprises fused metal particles. The implant component 300 has two condylar portions 310, 320, one for covering a resected medial condyle and the other for covering a resected lateral condyle of a distal end of a femur, during total knee arthroplasty. The implant component has anterior portion 330 for covering an anterior side of the resected femur.

The implant component 300 has a similar structure to the implant component 100 of the previous example, and similar features are denoted with reference numerals starting with a 3 instead of a 1.

As in the implant component 100 of the previous example, the implant component 300 of this example includes an articulation portion 304. In use, the articulation portion 104 is configured to articulate relative to a tibial component (not shown) of the orthopaedic implant and relative to a patellar component of a patellar implant (not shown) or a native patellar (not shown). More specifically, the articulation portion 304 is configured to be in sliding relationship with an articulating joint component of the tibial component, which is attached to a tibial implant component of the tibial component, and in sliding relationship with a patellar component or a patellar. The articulation portion 304 includes a main body 306. In this example, the main body 306 of the articulation portion 304 includes an internal volume of the articulation portion 304 and includes a superior surface 314 of the articulation portion 304. That is, the articulation portion 304 has an internal volume which is at least partially provided by the main body 306. In this example the superior surface is formed of three planar subsurfaces at angles to one another: an anterior subsurface 314a; a central subsurface 314b; and a posterior subsurface 314c.

In this example, the main body 306 has a porous structure. In this example, the entirety of the main body 306 has a porous structure. That is, the main body 306 includes a structure including a plurality of pores. In this example, the porous structure of the main body 306 includes, or provides, at least part of the internal volume and at least part of, preferably all of, the superior surface 314 of the main body 306.

The porous structure of the main body 306 is formed during the additive manufacturing process. The porous structure may be a lattice structure including a plurality of struts connected at nodes, the struts and nodes being formed during the additive manufacturing process.

The porous structure of the main body 306 allows or promotes bone ingrowth into the main body 306, as in the implant component 100 of the previous example.

In this example, the articulation portion 304 includes an articulation surface 308. The articulation surface 308, in the region of the condylar portions 310, 320, is configured to articulate over a surface of the tibial component of the orthopaedic implant when in use. The articulation surface 308, in the region of the anterior portion 330, is configured to articulate over a surface of a patellar implant component, or a surface of a native patellar, when in use.

The articulation portion 304 has a peripheral portion 316 which comprises the articulation surface 308. In this example the peripheral portion 316 forms a periphery of the main body 306. The peripheral portion 316 of this example is solid. That is, the peripheral portion 316 is substantially non-porous relative to the porous main body 306. As is visible in FIGS. 9 and 10, the peripheral portion 316 of this example forms, or provides, a shell or covering, to the porous main body 306. In this way, the peripheral portion 316 defines a cavity which is occupied by the main body 306, for example which is occupied or filled with the porous or lattice structure.

In this example, the articulation surface 308 and the peripheral portion 316 is integral with the main body 306. That is, the articulation surface 308 and peripheral portion 316 is unitary with the main body 306, the peripheral portion 316 forming a periphery of the main body 306. The articulation surface 308 forms an inferior surface and an anterior surface of the articulation portion 304.

During manufacture, the articulation surface 308 is formed from the peripheral portion 316 of the articulation portion 304, the peripheral portion 316 being formed on the periphery of the main body 306—in particular on the inferior surface and anterior surface of the main body 306. The peripheral portion 316 is additively manufactured so as to be integral with the main body 306. In this example the peripheral portion 316 is solid or non-porous.

To form the articulation surface 308 from the peripheral portion 316, the external surface of the peripheral portion 316 (that is, the surface of the peripheral portion 316 facing away from the main body 306) is machined and/or polished to provide a solid, non-porous articulation surface 308 that has surface properties, for example sizes of carbides, protrusions and pits, which are suitable for articulation over a tibial component and/or patellar and/or patella component. It will be appreciated that the surface properties have ranges of acceptable values which differ depending upon factors such as the size of the femoral implant component and characteristics of the patient. The ranges of acceptable values may also be determined in dependence on predicted performance of other areas of the component. For example, greater ranges of acceptable values may be used if the reduction in a probability of failure of other parts of the implant outweighs any disadvantages associated with a poorer quality of the articulation surface 308. It will also be appreciated that the surface properties may differ for different, non-femoral implants, as in the examples provided subsequently.

The fixing portion 302 and the articulation portion 304 comprise fused particles. In particular, the fixing portion 302 and the articulation portion 304 comprise particles that are fused together as part of an additive manufacturing process. For example the additive manufacturing process may include providing a powder and then selectively heating areas of the powder to fuse particles of the powder together into a unitary component. In this example, the additive manufacturing process uses metal powder such that the fixing portion 302 and the articulation portion 304 are formed of fused metal particles. The metal powder may, for example, include a cobalt chrome alloy. Any suitable method of additive manufacture may be used, for example a technique referred to as laser sintering.

In the example femoral component 300 of FIGS. 9 and 10, the fixing portion 302 is in the form of a two pegs 310 located on the articulation portion 304. More specifically, the pegs 310 are located on the central subsurface 314b. The pegs 310 may be fully porous, or lattice, or may have solid tips as is in the pegs 110 described in the previous example.

As with the implant component 100 of the previous example, by additively manufacturing the femoral implant component 300, the femoral implant component 300 is largely produced using a single process. This is in contrast to femoral implant components of the prior art, which are typically cast and then coated with a porous coating. As such, the femoral implant component 300 described herein is quicker and more cost effective to produce than known femoral implant components. In addition, additively manufacturing the femoral implant component 300 allows the internal structure of the femoral implant component 300 to be better controlled. For example, the internal structure of the femoral implant component 300 can include a porous structure allowing for more significant bone ingrowth. This is not possible with cast femoral implant components.

Indeed, the concept is applicable to other implant components. In one example, the implant component is a talus implant component for an orthopaedic implant for ankle arthroplasty. The articulation portion is configured to articulate relative to a tibial component, e.g., to be in a sliding relationship with a plastic articulating joint component attached to a tibial implant component. The fixing portion is configured to fix the talus implant component to a bone, i.e. a talus, of a patient.

In another example, the implant component is a femoral implant component for an orthopaedic implant for hip arthroplasty. The articulation portion is a ball which is integral with a femoral stem. That is, no plastic ball is provided. The articulation portion is configured to articulate relative to an acetabular cup of the orthopaedic implant, e.g., to be in a sliding relationship with a plastic liner located inside the acetabular cup. The fixing portion is configured to fix the femoral implant component to a bone, i.e., a femur, of a patient.

In another example, the implant component is a humeral implant component for an orthopaedic implant for shoulder arthroplasty. A metal ball of the humeral implant component is integral with a humeral stem. The articulation portion is configured to articulate relative to a glenoid fossa component located on the scapula, e.g., to be in a sliding relationship with a plastic articulating joint component of the glenoid fossa component. The fixing portion is configured to fix the humeral implant component to a bone, i.e., a humerus, of a patient In another example, the implant component is a scapula implant component for an orthopaedic implant for shoulder arthroplasty. A glenoid sphere of the scapula implant provides the articulation portion, and the articulation portion is configured to articulate relative to a humeral component, e.g., to be in a sliding relationship with a plastic articulating joint component attached to a humeral implant component. The fixing portion is configured to fix the scapula implant component to a bone, i.e., a scapula, of a patient.

In another example, the implant component may be used as an orthopaedic implant for hemi-arthroplasty. In such examples, the articulation portion is configured to articulate relative to the native anatomy within the joint-that is, the patient's bone rather than an additional component of the orthopaedic implant. For example, taking hip hemi-arthroplasty as a non-limiting example, the articulation portion is configured to articulate relative to the acetabular of the patient.

It will also be appreciated by those skilled in the art that any number of combinations of the aforementioned features and/or those shown in the appended drawings provide clear advantages over the prior art and are therefore within the scope of the invention described herein.

The following numbered clauses are provided:

Clause 1. A method of manufacturing an implant component for an orthopaedic implant for arthroplasty, the method comprising:
  additively manufacturing an articulation portion of the implant component, the articulation portion being configured to articulate relative to another component of the orthopaedic implant or to native anatomy; and
  additively manufacturing a fixing portion of the implant component integrally with the articulation portion, the fixing portion being configured to fix the implant component to a bone of a patient.

Clause 2. A method according to clause 1, wherein the articulation portion comprises:
  a main body; and
  a peripheral portion formed integrally on the periphery of the main body.

Clause 3. A method according to clause 2, wherein additively manufacturing the articulation portion of the implant component comprises:
  additively manufacturing a porous structure forming the main body of the articulation portion.

Clause 4. A method according to any preceding clause, wherein additively manufacturing the articulation portion of the implant component comprises:
  additively manufacturing a peripheral portion of the articulation portion.

Clause 5. A method according to clause 4, further comprising machining and/or polishing a surface of the peripheral portion to provide an articulation surface, the articulation surface being configured to articulate over a surface of the other component of the orthopaedic implant or a surface of the native anatomy, when in use.

Clause 6. A method according to any preceding clause, wherein the fixing portion comprises one or more pegs.

Clause 7. A method according to clause 6, wherein additively manufacturing the fixing portion comprises:
  additively manufacturing a porous structure, the porous structure forming at least part of the one or more pegs.

Clause 8. A method according to clause 7 when dependent on clause 3, wherein the porous structure forming the one or more pegs is integral with the porous structure forming the main body.

Clause 9. A method according to clause 7 or 8, wherein additively manufacturing the fixing portion comprises:
  additively manufacturing a porous structure, the porous structure forming at least part of the one or more pegs; and
  additively manufacturing a solid peripheral rim around the porous structure at a tip for each of the one or more pegs.

Clause 10. A method according to any preceding clause, further comprising applying a coating to any part of the fixing portion, the coating being made from a different material to the fixing portion.

Clause 11. A method according to any preceding clause, wherein the fixing portion and the articulation portion are additively manufactured from metal.

Clause 12. A method according to clause 11, wherein the fixing portion and the articulation portion are additively manufactured by:
  providing metal powder; and
  selectively heating areas of the metal powder to fuse the metal powder together into a unitary metallic component.

Clause 13. A method according to any preceding clause, wherein the implant component is a femoral implant component for an orthopaedic implant for knee arthroplasty, wherein the articulation portion is configured to articulate relative to a tibial component of the orthopaedic implant or to native anatomy, and wherein the fixing portion is configured to fix the femoral implant component to a bone of a patient.

Clause 14. Computer readable instructions which, when executed by an additive manufacturing machine, are configured to implement the method according to any of clauses 1 to 13.

Clause 15. An implant component for an orthopaedic implant for arthroplasty, the implant component obtained using a method according to any of clauses 1 to 13.

Clause 16. An implant component for an orthopaedic implant for arthroplasty, the implant component comprising:

an articulation portion being configured to articulate relative to another component of the orthopaedic implant or to native anatomy; and
a fixing portion, the fixing portion being configured to fix the implant component to a bone of a patient;
wherein the fixing portion and the articulation portion are unitary and comprise fused particles.

Clause 17. An implant component according to clause 16, wherein the articulation portion comprises:
a main body; and
an articulation surface which is integral with the main body, the articulation surface being configured to articulate over a surface of another component of the orthopaedic implant or a surface of the native anatomy, when in use.

Clause 18. An implant component according to clause 17, wherein the main body of the articulation portion has a porous structure.

Clause 19. An implant component according to any of clauses 16 to 18, wherein the fixing portion comprises one or more pegs.

Clause 20. An implant component according to clause 19, wherein at least part of the one or more pegs has a porous structure.

Clause 21. An implant component according to clause 20 when dependent on clause 18, wherein the porous structure of the one or more pegs is integral with the porous structure of the main body.

Clause 22. An implant component method according to clause 20 or clause 21, wherein the one or more pegs comprises a solid peripheral rim around the porous structure at a tip of the peg.

Clause 23. An implant component according to any of clauses 16 to 22, wherein the fixing portion and the articulation portion comprise fused metal particles.

Clause 24. An implant component according to any of clauses 16 to 23, comprising a coating disposed on at least part of the fixing portion, the coating being of a different material to the fixing portion.

Clause 25. An implant according to any of clauses 16 to 24, wherein the implant component is a femoral implant component for an orthopaedic implant for knee arthroplasty, wherein the articulation portion is configured to articulate relative to a tibial component of the orthopaedic implant, and wherein the fixing portion is configured to fix the femoral implant component to a bone of a patient.

What is claimed is:

1. An unicompartmental femoral implant component for an orthopaedic implant for partial knee arthroplasty, the unicompartmental femoral implant component comprising:
an articulation portion and a fixing portion,
wherein the articulation portion comprises:
a main body having a lattice structure, the lattice structure comprising a plurality of struts connected at nodes; and
a non-porous solid peripheral portion comprising an articulation surface, the non-porous solid peripheral portion forming a periphery of the main body, the articulation surface being configured to articulate relative to a tibial component of the orthopaedic implant or to native anatomy, when in use;
wherein the fixing portion extends from a surface of the main body, the fixing portion being configured to fix the unicompartmental femoral implant component to a femur of a patient, the fixing portion comprising one or more pegs each comprising an internal volume and a solid tip, the internal volume of each of the one or more pegs comprising a porous structure that forms at least part of the internal volume of the peg, wherein the porous structure is a lattice structure comprising a plurality of struts connected at nodes;
wherein the fixing portion is monolithically formed with the articulation portion by additive manufacturing;
wherein the fixing portion and the articulation portion comprise fused particles;
wherein the non-porous solid peripheral portion forms a shell to the main body, such that the main body occupies a cavity defined by the non-porous solid peripheral portion; and
wherein the solid tip surrounds a part of the porous structure at a tip of the peg.

2. The femoral implant component according to claim 1, wherein the lattice structure of the one or more pegs is integral with the lattice structure of the main body.

3. The femoral implant component according to claim 1, comprising a coating disposed on at least part of the fixing portion, the coating being of a different material to the fixing portion.

4. The femoral implant component according to claim 1, wherein the main body of the articulation portion comprises a superior surface of the articulation portion, the lattice structure of the main body comprising at least part of the superior surface of the main body.

5. The femoral implant component according to claim 1, wherein the lattice structure has a bulk elastic modulus of between 0.1 Gigapascals (GPa) and 5 GPa.

6. The femoral implant component according to claim 5, wherein the lattice structure has a porosity of between 5% and 30%.

7. The femoral implant component according to claim 6, wherein the lattice structure has a strut density of between 2 and 7 struts per cubic millimeter.

8. The femoral implant component according to claim 7, wherein each strut has a thickness of between 100 microns and 400 microns.

* * * * *